(12) United States Patent
Ma et al.

(10) Patent No.: US 10,753,876 B2
(45) Date of Patent: Aug. 25, 2020

(54) PORTABLE MULTI-COLOR FLUORESCENCE DETECTION DEVICE

(71) Applicant: Delta Electronics Int'l (Singapore) Pte Ltd, Singapore (SG)

(72) Inventors: Bo Ma, Singapore (SG); Jei-Yin Yiu, Singapore (SG); Jack Sheng Kee, Singapore (SG)

(73) Assignee: DELTA ELECTRONICS INT'L (SINGAPORE) PTE LTD, Singapore (SG)

( * ) Notice: Subject to any disclaimer, the term of this patent is extended or adjusted under 35 U.S.C. 154(b) by 0 days.

(21) Appl. No.: 16/280,358

(22) Filed: Feb. 20, 2019

(65) Prior Publication Data

US 2019/0271651 A1    Sep. 5, 2019

(30) Foreign Application Priority Data

Mar. 2, 2018  (SG) .......................... 10201801853W

(51) Int. Cl.
| | |
|---|---|
| *C12Q 1/686* | (2018.01) |
| *G01N 21/64* | (2006.01) |
| *G02B 27/14* | (2006.01) |
| *G02B 27/09* | (2006.01) |
| *G02B 3/08* | (2006.01) |

(52) U.S. Cl.
CPC .......... *G01N 21/6486* (2013.01); *G02B 3/08* (2013.01); *G02B 27/0961* (2013.01); *G02B 27/0966* (2013.01); *G02B 27/149* (2013.01); *G01N 2201/0638* (2013.01); *G01N 2201/0833* (2013.01)

(58) Field of Classification Search
CPC .......... G01N 21/6452; G01N 21/6486; C12Q 1/686; C12Q 2531/113; C12Q 1/6844; C12Q 1/689; C12Q 1/6853; C12Q 1/6848; B01L 7/52; B01L 2300/0654; B01L 2300/0829
See application file for complete search history.

(56) References Cited

U.S. PATENT DOCUMENTS

| | | | |
|---|---|---|---|
| 5,457,574 A | * | 10/1995 | Eichenlaub ............ H04N 13/32 359/619 |
| 6,246,525 B1 | | 6/2001 | Ikami |
| 6,498,690 B2 | | 12/2002 | Ramm et al. |

(Continued)

*Primary Examiner* — David P Porta
*Assistant Examiner* — Fani Boosalis
(74) *Attorney, Agent, or Firm* — Kirton McConkie; Evan R. Witt

(57) ABSTRACT

The portable multi-color fluorescence detection device includes a plurality of wells, an illumination module and a detection module. The plurality of wells configured for accommodating fluorescent mixture. The illumination module comprises at least two light sources and a color combination prism, the color combination prism being configured for combing different frequency light emitting form the at least two light sources into combination beams in parallel toward the plurality of wells for exciting the fluorescent mixture to generate fluorescent light. The detection module comprises a plurality of fiber bundles and an imaging unit, each of the fiber bundles be coupled with the corresponding well, wherein the fluorescent light is transmitted to the imaging unit through the plurality of fiber bundles and converted into an electrical signal by the imaging unit.

14 Claims, 9 Drawing Sheets

(56) References Cited

U.S. PATENT DOCUMENTS

| | | |
|---|---|---|
| 6,746,864 B1 | 6/2004 | McNeil et al. |
| 6,852,986 B1 | 2/2005 | Lee et al. |
| 6,982,166 B2 | 1/2006 | Sandell |
| 7,015,484 B2 | 3/2006 | Gillispie et al. |
| 7,148,043 B2 | 12/2006 | Kordunsky et al. |
| 7,273,749 B1 | 9/2007 | Wittwer et al. |
| 7,289,217 B2 | 10/2007 | Boege et al. |
| 7,315,376 B2 | 1/2008 | Bickmore, Jr. et al. |
| 7,369,227 B2 | 5/2008 | Gutekunst et al. |
| 7,663,750 B2 | 2/2010 | Bahatt et al. |
| 7,687,260 B2 | 3/2010 | Gutekunst |
| 7,700,928 B2 | 4/2010 | Rasnow et al. |
| 7,749,736 B2 | 7/2010 | Kordunsky et al. |
| 8,278,114 B2 | 10/2012 | Gambini et al. |
| 8,557,569 B2 | 10/2013 | Boege et al. |
| 8,840,848 B2 * | 9/2014 | Kraihanzel ........ G01N 35/1081 422/417 |
| 8,865,473 B2 | 10/2014 | Gambini et al. |
| 8,900,828 B2 | 12/2014 | Smith et al. |
| 8,921,098 B2 | 12/2014 | Gambini et al. |
| 8,987,685 B2 | 3/2015 | Fawcett et al. |
| 9,080,207 B2 | 7/2015 | Handique et al. |
| 9,089,828 B2 * | 7/2015 | Howell ................ G01N 21/253 |
| 9,096,892 B1 | 8/2015 | Klemer et al. |
| 2001/0046050 A1 | 11/2001 | Hoyt |
| 2003/0011772 A1 | 1/2003 | Abe et al. |
| 2003/0133640 A1 * | 7/2003 | Tiefenthaler ......... G01N 21/648 385/12 |
| 2004/0178357 A1 | 9/2004 | King |
| 2005/0133724 A1 | 6/2005 | Hsieh et al. |
| 2006/0289786 A1 | 12/2006 | Taylor et al. |
| 2007/0114444 A1 | 5/2007 | Reid et al. |
| 2007/0268694 A1 * | 11/2007 | Bailey ................ G02B 27/0955 362/231 |
| 2008/0277595 A1 | 11/2008 | Lundquist et al. |
| 2009/0009767 A1 | 1/2009 | Boege et al. |
| 2012/0295249 A1 * | 11/2012 | Cherubini ............ G01N 21/645 435/5 |
| 2014/0273181 A1 | 9/2014 | Abbott et al. |
| 2014/0283945 A1 | 9/2014 | Jones et al. |
| 2015/0232916 A1 | 8/2015 | Rasmussen et al. |
| 2015/0350630 A1 * | 12/2015 | Kita ................ G03B 33/06 349/9 |
| 2016/0193604 A1 * | 7/2016 | McFarland ............ B01L 9/527 359/385 |
| 2016/0261838 A1 * | 9/2016 | Ranieri ................ H04N 9/312 |

\* cited by examiner

PORTABLE MULTI-COLOR FLUORESCENCE DETECTION DEVICE

FIELD OF THE INVENTION

The present invention relates to a fluorescence detection device, and more particularly to a portable multi-color fluorescence detection device with high signal-to-noise ratio.

BACKGROUND OF THE INVENTION

The demand of acquiring large amounts of a specific segment of DNA efficiently for different purposes is booming in recent years. Among the entire existing DNA sequencing techniques, Polymerase Chain Reactions (PCR) is one of the most economical and straightforward techniques amplifying billion copies of targeted DNA segments in short period of time. The applications of PCR technique are broadly adopted, such as selective DNA isolation for genetic identification, forensic analysis for analyzing ancient DNA in archeology, medical applications for genetic testing and tissue typing, fast and specific diagnosis of infectious diseases for hospitals and research institutes, inspection of environmental hazards for food safety, genetic fingerprint for investigating criminals, and so on. For PCR technique, only small amount of DNA samples are required from blood or tissues. By utilizing fluorescent dye into the nucleic acids solutions, the amplified DNA segments could be detected through the help of fluorescent molecules.

To simultaneously detect and analyze the presence of targeted nucleic acids in a batch of biological samples, fluorescent dyes detection technique is usually applied. After the light source at specific wavelength illuminates on the targeted nucleic acids, the DNA-binding dyes or fluorescein-binding probes of the nucleic acids will react and enable fluorescent signals to be emitted. The fluorescent signal is an indication of the existence of the targeted nucleic acids. This technique has been employed for the novel PCR technique, which is called real time quantitative PCR or qPCR. qPCR is the early-phase PCR detection with higher sensitivity and better precision than the conventional PCR technique which is an end-point PCR detection. An optical device is essential to detect the fluorescent light emitted from the specific nucleic acids segments for qPCR technique. The optical device has to provide a light source to excite fluorescent probes at their specific wavelengths, and in the meanwhile, it detects the fluorescent signals emitted from the probes.

The fluorescent detection systems have been well developed in many fields, such as the application of fluorescence spectroscopy and fluorescence microscopy. An array of single color light source with a set of filters and optical components could easily apply on particular fluorescent probe. While, if apply in multi-color light source fluorescence detection, more filters and correspondingly optical components are needed, which may result in bulky size of the device.

Therefore, the difficulties of developing a portable multi-color fluorescent detection device have not been solved in the market because of its bulky size and high cost with high signal-to-noise ratio (SNR).

In light with the requirements and the issues addressed above, there is a need of providing an improved fluorescence detection device with high signal-to-noise ratio for PCR, qPCR or biological sample detecting application.

SUMMARY OF THE INVENTION

An object of the present invention is to provide a portable multi-color fluorescence detection device with high signal-to-noise ratio for minimizing the size and the weight of the device, and still providing superior performance for a portable fluorescence detection system with affordable cost.

According to an aspect of the present invention, there is a portable multi-color fluorescence detection device comprising a plurality of wells, an illumination module and a detection module. The plurality of wells configured for accommodating fluorescent mixture. The illumination module comprises at least two light sources and a color combination prism. The color combination prism being configured for combing different frequency light emitting form the at least two light sources into combination beams in parallel toward the plurality of wells for exciting the fluorescent mixture to generate fluorescent light. The detection module comprises a plurality of fiber bundles and an imaging unit, each of the fiber bundles be coupled with the corresponding well, wherein the fluorescent light is transmitted to the imaging unit through the plurality of fiber bundles and converted into an electrical signal by the imaging unit.

In an embodiment, the illumination module further comprises at least two filters, and each filter is arranged in front of each light source.

In an embodiment, the filter is an excitation filter.

In an embodiment, the filter is a stationary band pass filter.

In an embodiment, the color combination prism is an X-Cube.

In an embodiment, the color combination prism is a Philips prism having a plurality of prism segments.

In an embodiment, the illumination module further comprises a beam shaping module located between the color combination prism and the plurality of wells.

In an embodiment, the beam shaping module comprises a beam shaping component and a cylinder lens.

In an embodiment, the beam shaping component comprises two fly eye lenslet arrays.

In an embodiment, the beam shaping component is an aspherical shaping component, and the cylinder lens is a cylinder Fresnel lens.

In an embodiment, the portable multi-color fluorescence detection device further comprises a support for supporting the plurality of wells.

In an embodiment, the support further comprises a heating chamber for accommodating the plurality of wells.

In an embodiment, the plurality of wells can be heated and cooled being in the thermal contact with the heating chamber.

In an embodiment, the plurality of wells are applied in a close-loop fluidics system.

In an embodiment, the imaging unit comprises of imaging lens, filters and transducers, each imaging lens is arranged to transfer the fluorescence light from each fiber bundle to the corresponding transducer, and the filter is sandwiched between the imaging lens and transducer.

The above objects and advantages of the present invention become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only; it is not intended to be exhaustive or to be limited to the precise form disclosed.

The invention provides a portable multi-color fluorescence detection device, which is an optical instrument to image the fluorescence of the plurality of wells. To be more specifically, the invention is to analyze simultaneously a plurality of PCR amplifications taking place in real time and to image the fluorescence intensity as a measure for specific target interaction in the multi-well of the micro liter plate.

Figure 1:
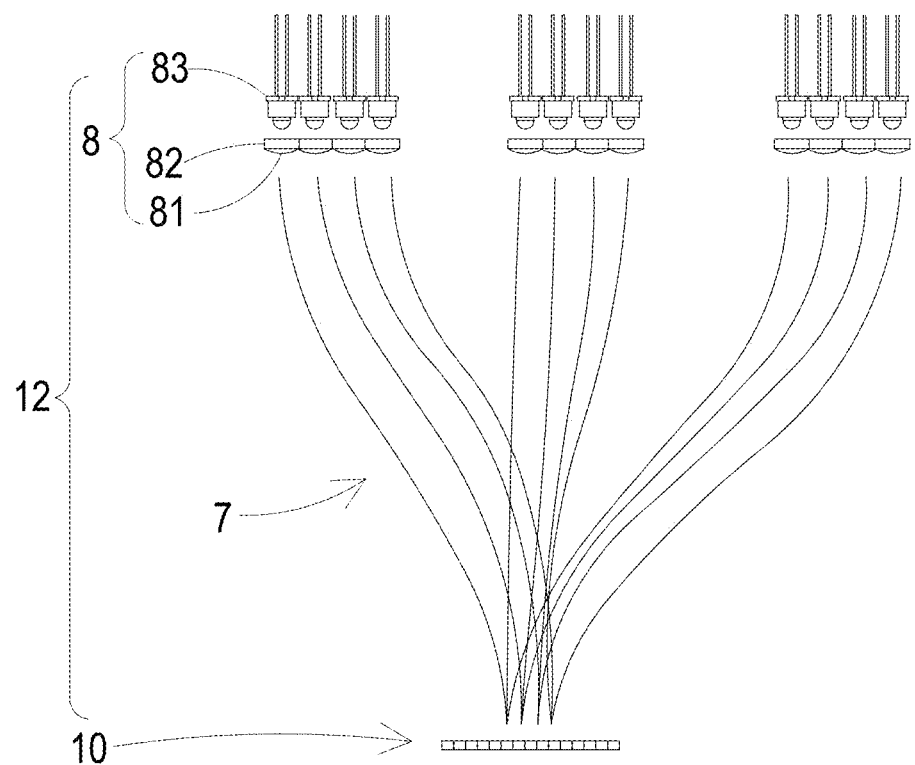
FIG. 1 shows a schematic view of the portable multi-color fluorescence detection device according to a preferred embodiment of the present invention.
Figure 1:
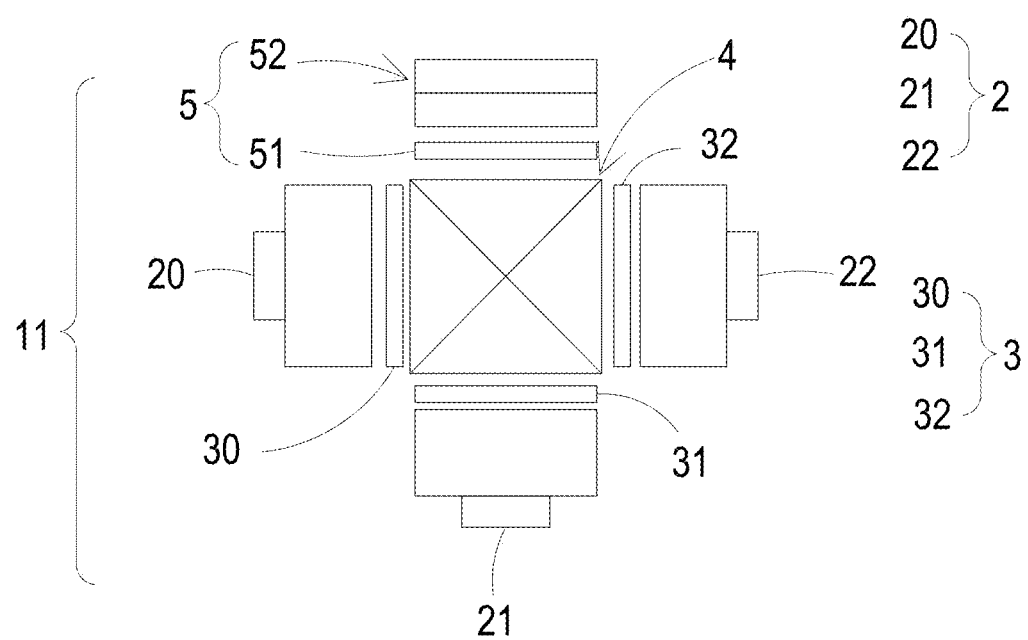

FIG. 1 shows a schematic view of the portable multi-color fluorescence detection device according to a preferred embodiment of the present invention. As shown in FIG. 1, the present invention provides the portable multi-color fluorescence detection device 1 comprising a plurality of wells 10, an illumination module 11 and a detection module 12. The plurality of wells 10 configured for accommodating fluorescent mixture. The illumination module 11 comprises at least two light sources 2 and a color combination prism 4, the color combination prism 4 is configured for combing different frequency light emitting form the at least two light sources 2 into combination beams in parallel toward the plurality of wells 10 for exciting the fluorescent mixture to generate fluorescent light. The detection module 12 comprises a plurality of fiber bundles 7 and an imaging unit 8. Each of the fiber bundle 7 couples with the corresponding well 10, wherein the fluorescent light is transmitted to the imaging unit 8 through the plurality of fiber bundles 7 and converted into an electrical signal by the imaging unit 8. In one embodiment of the invention, each the light source 2 emits light with a single excitation frequency, preferably said light source 2 is a laser, and most preferably said light source 2 is a LED, but not limited thereto. In the embodiment as shown in FIG. 1, the at least two light sources 2 comprises three light sources 20, 21, 22, each light source 20, 21, 22 comprises at least one constituent of the excitation spectrum for the specified frequency. For example, red color light source 20 locates in the left, which comprises one constituent of red color spectrum. Blue color light source 21 locates in the middle, which comprises one constituent of blue color spectrum. Green color light source 22 locates at the right, which comprises one constituent of green color spectrum.

Within the scope of this invention, each light source 2 has preferably filter 3. Filter 3 is arranged in front of each light source 2, which is but not limited to a stationary band pass filter. In the embodiment of the present invention, R, G, B band filters 30, 31, and 32 are placed in front of the red color, blue color and green color light sources 20, 21, and 22, respectively. In some embodiment, the filter 3 applied in the illumination module 11 is an excitation filter, which only allows the light falling within excitation bandwidth to pass through. The excitation filter 3 is an optical component that is capable of passing a specific wavelength for excitation form said light source 2, and yet blocking the rest portions of the wavelengths as noise signal.

The color combination prism 4 is used to combine the different light sources 20, 21, 22 with different frequency into one channel. In the invention, the color types could be as few as two, also could be as many as 5 different types. In some embodiments, the color combination prism 4 could be but not limited to an X-Cube. In other embodiments, the color combination prism 4 could be but not limited to Philips prism.

Figure 2:
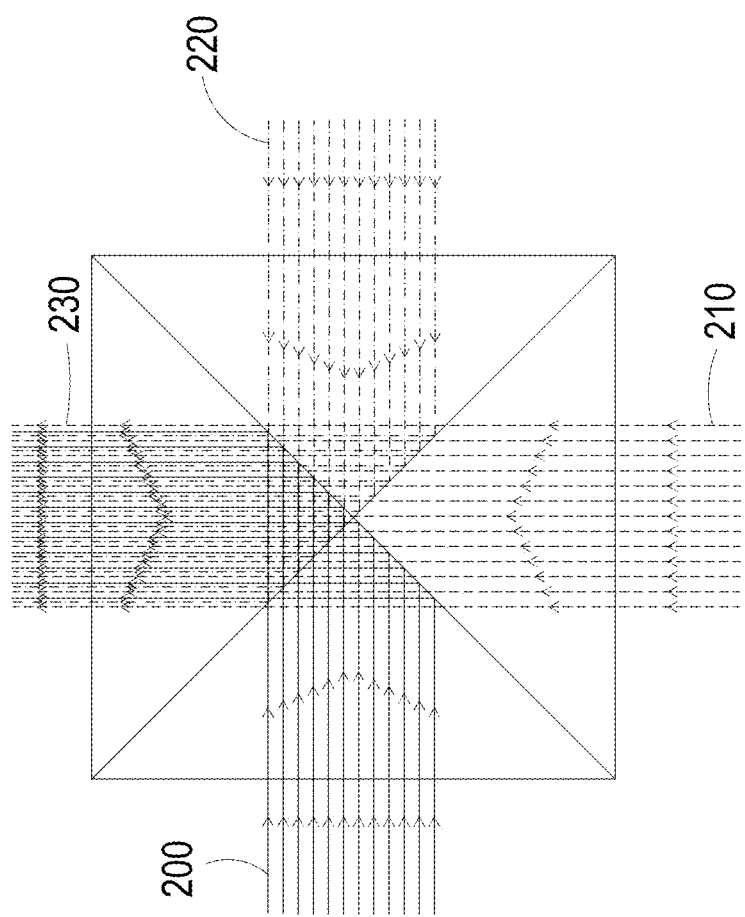
FIG. 2 shows the light path of the color combination prism combing different frequency light into one channel according to a preferred embodiment of the present invention.

Please refer to FIGS. 1 and 2, wherein FIG. 2 shows the light path of the color combination prism combing different frequency light into one channel according to a preferred embodiment of the present invention. In this embodiment of the invention, the color combination prism 4 is an X-Cube, which consists of 4 prism segments with angles of 45-90-45 degree to produce reflections. As shown in FIG. 1, the X-Cube color combination prism 4 is placed in the center, which combines the output of different ports of the light sources 20, 21, 22 into one channel leading to the plurality of wells 10. As shown in FIG. 2, the red light spectrum 200 emitted from the red color light source 20 will be reflected by long pass filter coated on diagonal surface of the X-cube color combination prism 4.

The blue light spectrum 210 emitted from the blue color light source 21 will transmit the prism at 0 incidence degree. The green spectrum 220 emitted from the green color light source 22 will be reflected by the short pass filter coated on the anti-diagonal surface. The red light spectrum 200, the blue light spectrum 210, and the green spectrum 220 are combined into combination beams 230 in one channel by the X-Cube color combination prism 4, and the combination beams 230 are in parallel toward the plurality of wells 10 for exciting the fluorescent mixture to generate fluorescent light.

Figure 3A:
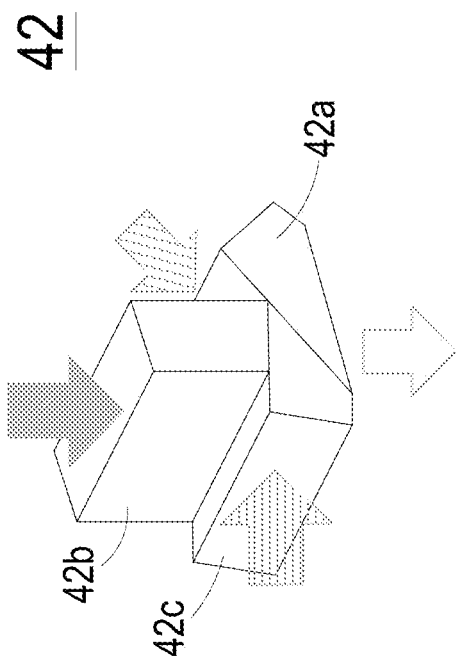
FIGS. 3A to 3D show schematic views of the color combination prisms according to different embodiments of the present invention.
Figure 3B:
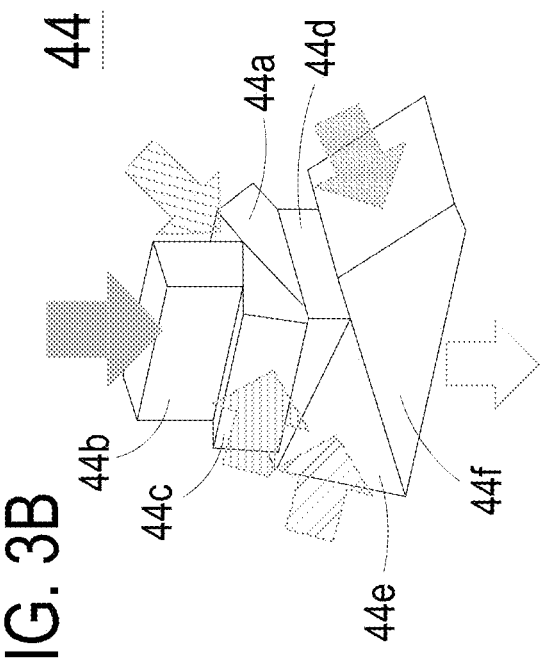

Please refer to FIGS. 3A to 3D, FIGS. 3A to 3D show schematic views of the color combination prisms according to different embodiments of the present invention. In the scope of this invention, to further expand more or few channels is straightforward but requires extreme care in design to avoid imbalance in the optical path lengths or variations in the size of the ray bundle in each channel. For example, as shown in FIG. 3A, the color combination prism 41 is a Philips prism with two prism segments 41a, 41b for two channels, and the center angled segment 41a is omitted because no air gap is then required. Either a long pass or short pass or even a band pass filter can be provided at the junction between the prism segments 41a and 41b, but not limited thereto. As shown in FIG. 3B, the color combination prism 42 comprises three prism segments 42a, 42b and 42c for three channels, and there is also no air gap between the prism segments 42a, 42b, and 42c.

Figure 3C:
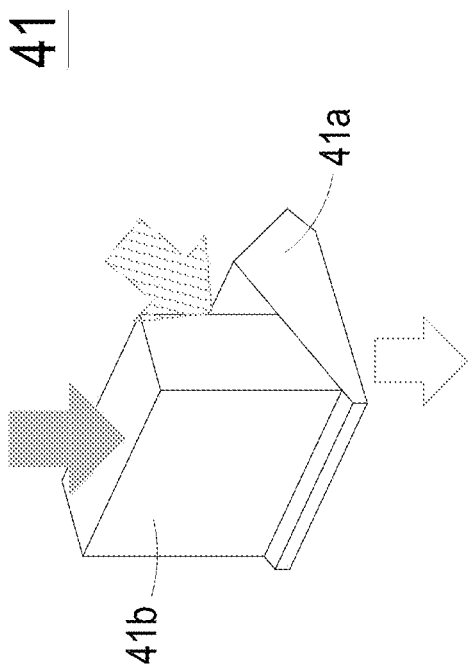
Figure 3D:
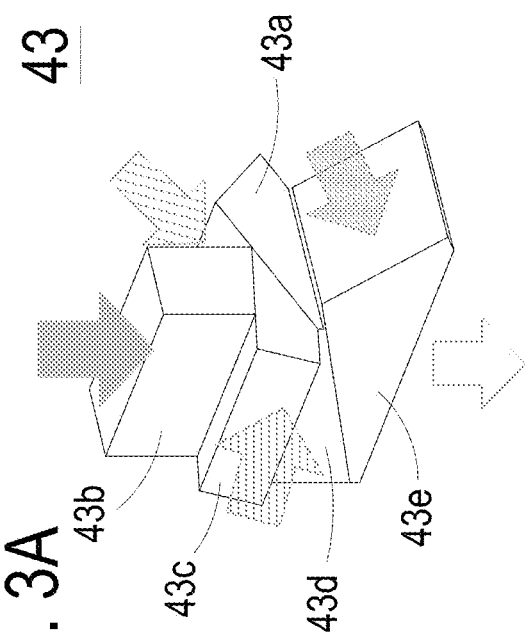

As shown in FIG. 3C, for four channels in the scope of this invention, three prism segments 43a, 43b, and 43c are stacked on two prism segments 43d, 43e to form the color combination prism 43. In this embodiment, the top channel of the prism segment 43b is lost on the bottom section because it serves only as a conduit to the top section. The bottom prism segments 43d and 43e must be larger than the top prism segments 43a, 43b, and 43c to provide equal optical paths and be rotated 90 degrees to provide room to mount all of the sensors. For five channels, the color combination prism 44 as shown in FIG. 3D, three prism segments 44a, 44b, and 44c are stacked on another three prism segments 44d, 44e, and 44f to form the color combination prism 44. The top channel the prism segment 44b is also lost on the bottom section as in the four-channel color combination prism 43. Similarly, the bottom prism segments 44d, 44e, and 44f must be larger than the top prism segments 44a, 44b, and 44c and be rotated 90 degrees.

Figure 4:
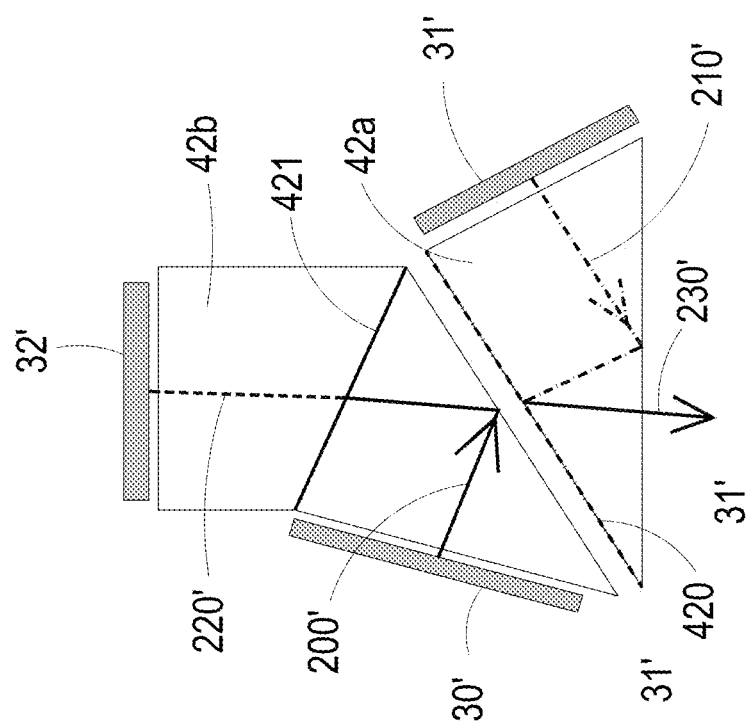
FIG. 4 shows the light path of color combination prism of FIG. 3B.

FIG. 4 shows the light path of color combination prism of FIG. 3B. The color combination prism 42 comprises three prism segments 42a, 42b and 42c, wherein a first filter 420 coated on the hypotenuse surfaces of the prism segment 42a, which is backed by an air gap and with a sealed edge to produce total internal reflection in the next segment. In some embodiments, the thickness of the first filter 420 is but not limited to 10 microns wide. The blue light spectrum 210' emits perpendicular to the filter 31' and is reflected from the bottom surface of the prism segment 42a, and reflected again and finally exits from the output port. The second filter 421 is a short pass type filter that reflects red frequency and passes green frequency, which is deposited on the bottom surface of the prism segment 42b, where no air gap is required, and the prism segments 42b and 42c are glued together. As shown in FIG. 4, the red light spectrum 200' is reflected a second time and then exits, while the green light spectrum 220' passes straight through the second filter 421 and exits. As same as the embodiment shown in FIG. 2, the red light spectrum 200', the blue light spectrum 210', and the green spectrum 220' are combined into a combination beam 230 by the color combination prism 42 to orient in the same direction to the plurality of wells 10.

The color combination prisms 4~44, according to the embodiments of this invention, have characteristics that all output ports should be oriented in the same direction to the plurality of wells 10. All channels must have the same optical path length, the prism transmission should handle all polarizations with good uniformity, and ample space should be available for mounting of filters and sensors.

Figure 5A:
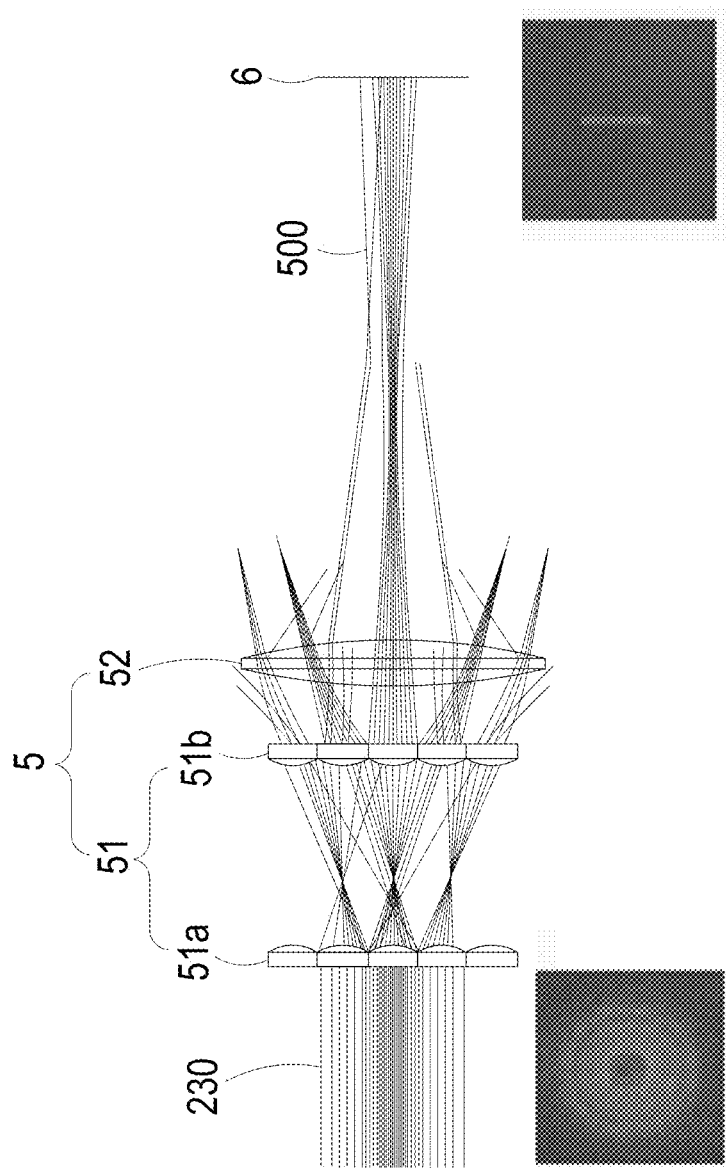
FIG. 5A shows the light path of the beam shaping module according to a first embodiment of the present invention.

Please refer to FIGS. 1 and 5A, FIG. 5A shows the light path of the beam shaping module according to a first embodiment of the present invention. In this embodiment, the illumination module 11 comprises a beam shaping module 5 located between the color combination prism 4 and the plurality of wells 10. The beam shaping module 5 is an assembly composed of multiple optical lenses, which is able to transform the combination beam 230 output from the color combination prism 4 into a homogenous line shape, and the line area will cover the whole wells 10. The beam shaping module 5 comprises a beam shaping component 51 and a cylinder lens 52, the beam shaping component 51 are for transforming the combination beam 230 into a top flat beam profile and the cylinder lens 52 continuously transform the flat beam profile to a uniform line shape profile. In one embodiment, the beam shaping component 51 consists of two fly eye lenslet arrays 51a and 51b as shown in FIG. 5A. The first fly eye lenslet array 51a segments the combination beam 230 and focuses it onto the second lenslet array 51b. The second fly eye lenslet array 51b is separated from the first fly eye lenslet array 51a by a distance equal to the focal length of the second fly eye lenslet array 51b. Together with the cylinder lens 52, the input combination beam 230 is transformed into a line shape beam 500 to the plane of the plurality of wells 10.

Figure 5B:
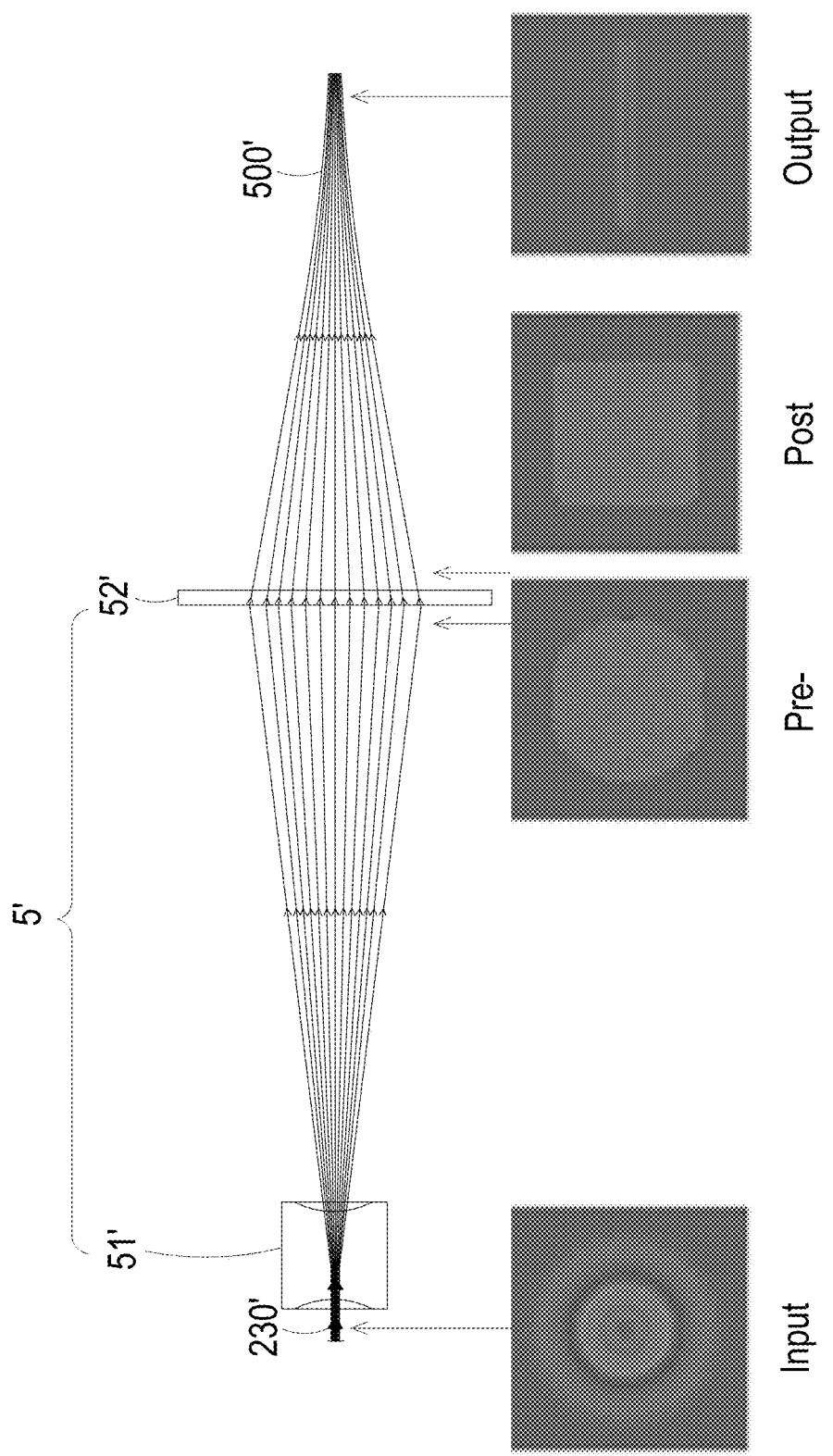
FIG. 5B shows the light path of the beam shaping module according to a second embodiment of the present invention.

FIG. 5B shows the light path of the beam shaping module according to a second embodiment of the present invention. In this embodiment, the beam shaping module 5' comprises an aspherical shaping lens 51' as beam shaping component and a cylinder Fresnel lens 52' as cylinder lens. The cylinder Fresnel lens 52' is thinner in comparison to normal cylinder lens 52 and made of plastic, which contributes the miniaturization of the system and cost down. As shown in FIG. 5B, the combination beam 230' is transformed into a top flat beam profile by the aspherical shaping lens 51', and then is converted into a line shape beam 500' by the cylinder Fresnel lens 52' on the plane of the plurality of wells 10.

Figure 6:
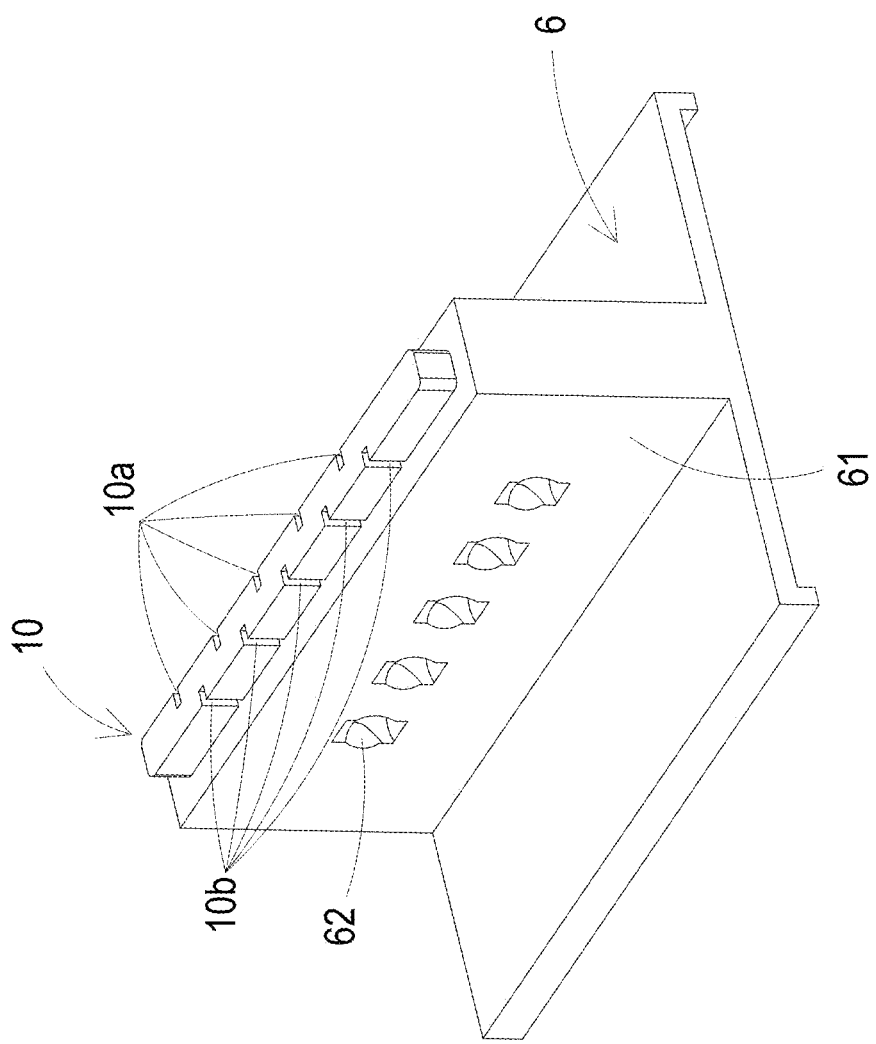
FIG. 6 shows a schematic view of the support according to a preferred embodiment of the present invention.

FIG. 6 shows a schematic view of the support according to a preferred embodiment of the present invention. In the embodiment of the present invention, the portable multi-color fluorescence detection device 1 comprises a support 6 for supporting the plurality of wells 10. In some embodiments, the support 6 further comprises a heating chamber 61 for accommodating the plurality of wells 10 with the fluorescent reaction mixture capable of performing a PCR reaction. There are a plurality of optical apertures 62 created at the front and the rear of the heating chamber 61 enable the efficient light signal transmission input from the at least two light sources 2 and emitted from the fluorescent reaction mixture of the plurality of wells 10, respectively.

Within the scope of this invention, the plurality of wells 10 are composed of two or more wells 10 being spatially separated and laterally distributed in horizontal direction. A heating component (not shown) disposed within the heating chamber 61 is adjacent to the plurality of wells 10, wherein the heating component is selected form a group consisting of an electronic resistance heater, electronic joule heater, peltier heater, chemical heater, microwave heater, and photonic heater. The plurality of wells 10 can be heated and cooled being in the thermal contact by the heating component of the heating chamber 61, which includes any means capable of controlling and altering the temperature of the plurality of wells 10 in a cyclic manner in order to perform cyclic PRC amplification. In some embodiments, the plurality of wells 10 are sandwiched by two thin layer membrane (not shown) to prevent fluorescent mixture leakage. The thin layer membrane is transparent in the excitation and fluorescence light and could be but not limited to be cemented by lamination process.

In other embodiments of this invention, the plurality of wells 10 have a functionalized chip, which integrated with close-loop fluidics system, wherein the sample could be, loaded in the plurality of wells 10 by the input channel 10a and flow out from the output channel 10b. Meanwhile, the quantity of the sample in the plurality of wells 10 is controlled by the value in the close-loop fluidics system.

In another embodiment of this invention, for the simultaneous monitoring hybridization events with samples containing nucleic acids from different wells 10, the fluorescent dyes are attached to the plurality of wells 10, and wherein the DNA array with fluorescent probes having different sequences. In the end, the hybridization events can be visualized by double-stranded nucleic acid binding fluorescent dyes. Thus, in the context of this invention for assay analysis, the support 6 comprises an assembly of multiple individual assays, wherein summarizes objects that are composed of two or more assays being spatially separated to realize a parallel analysis in the plurality of wells 10.

Figure 7A:
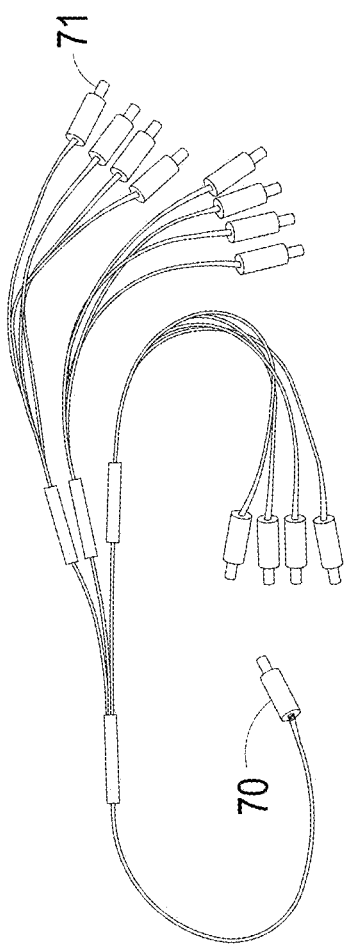
FIG. 7A shows a schematic view of the fiber bundles according to a preferred embodiment of the present invention.
Figure 7B:
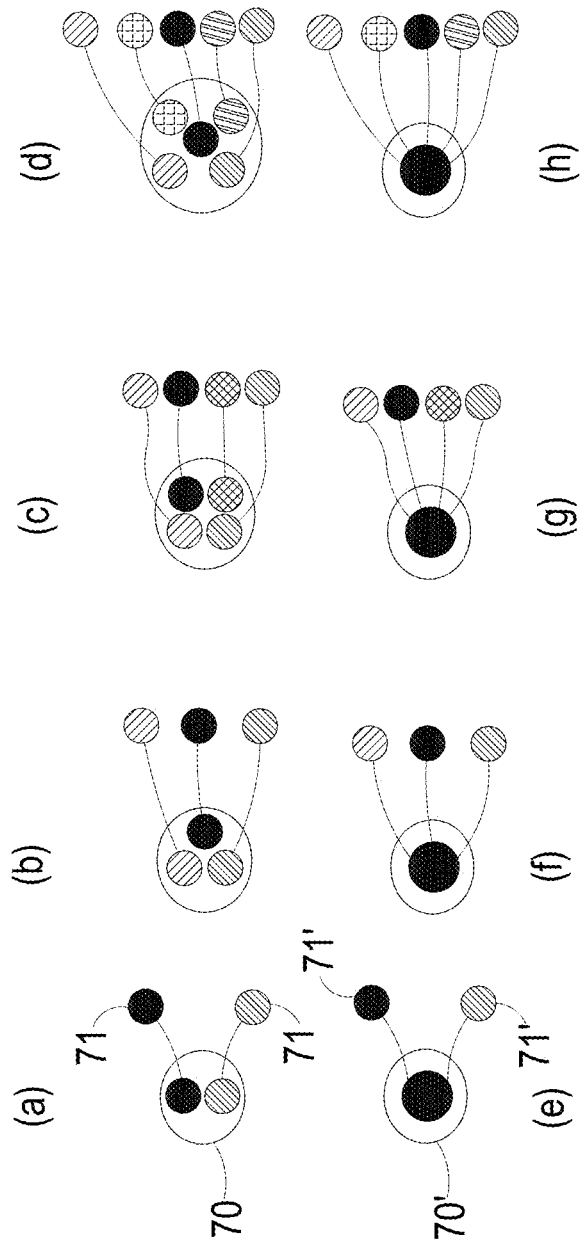
FIG. 7B shows the different end types of the fiber bundles of the present invention.

Please refer to FIGS. 1, 7A and 7B, FIG. 7A shows a schematic view of the fiber bundles according to a preferred embodiment of the present invention, FIG. 7B shows the different end types of the fiber bundles of the present invention. As shown in FIG. 1, the fiber bundles 7 of the detection module 12 locates in front of the plurality of wells 10 to transfer the fluorescence light to the imaging unit 8. For example, there are 4 fiber bundles 7 located in front of 4 wells 10 whereby after a certain distances, the fiber bundles 7 will split according the types and quantity of light source. In the said configuration, the 4 fiber bundles 7 will split into 3 and combine into a new 3 group, but not limited thereto. The multi-branch fiber bundles 7 are adopted to allow the system configuration more adaptable to the arrangement.

As shown in FIG. 7A, each fiber bundle 7 have one input end 70 attached one of the plurality of wells 10 and evenly split light among two or three output ends 71. Moreover, the higher NA value of each of fiber bundles 7, the more power will be collected and transferred to the imaging unit 8. As shown in the types (a)~(d) of FIG. 7B, the fiber bundles 7 could be one to one mode. Take the type (a) for example, the fiber bundles 7 comprises two fibers 7a' and 7b', which are stacked together at one input end 70 and arranged to attach on the plurality of wells 10 to collect fluorescence light. While, after traveling some distance, each fiber is spitted from one bundle and stacked together according the light frequency and light source types. In the other types (e)~(h) of FIG. 7B, the fiber bundles 7 is working as a beam splitter, wherein an input end 70' of a single fiber arrangement locates posterior to the plurality of wells 10. Thereby to collect the power and split the beam into a plurality of output ends 71' according the light frequency before the imaging unit 8.

Please refer to FIG. 1 again. The detection module 12 of the portable multi-color fluorescence detection device 1 further comprises an imaging unit 8. The imaging unit 8 comprises of imaging lens 81, filters 82 and transducers 83. Each imaging lens 81 is arranged to transfer the fluorescence light from each fiber bundle 7 to the corresponding transducer 83. Each transducer 83 is disposed to be receptive of fluorescence signals from the plurality of wells 10, whereas the transducer 83 is producing computable primary data. The filter 82 is sandwiched between the imaging lens 81 and transducer 83, which is a band pass fluorescence filter for transferring the fluorescence light from the plurality of wells 10 while blocking the excitation light.

In some embodiments, the imaging unit 8 could be arranged in an array format which including a transducer array 83 and micro lens array 81 to save the space and cost. In the context of this invention, a transducer 83 is a device able to convert visible light into electronic signals that are producible by a computer, such as Photo-Diode (PD), Photo-Diode array (PD array), or Avalanche Photo-Diode (APD), or Avalanche Photo-Diode array (APD array), etc. In one embodiment, the support 6, the fiber bundles 7 and the imaging unit 8 are constructed together on a housing (not shown), but not limited thereto.

Figure 8:
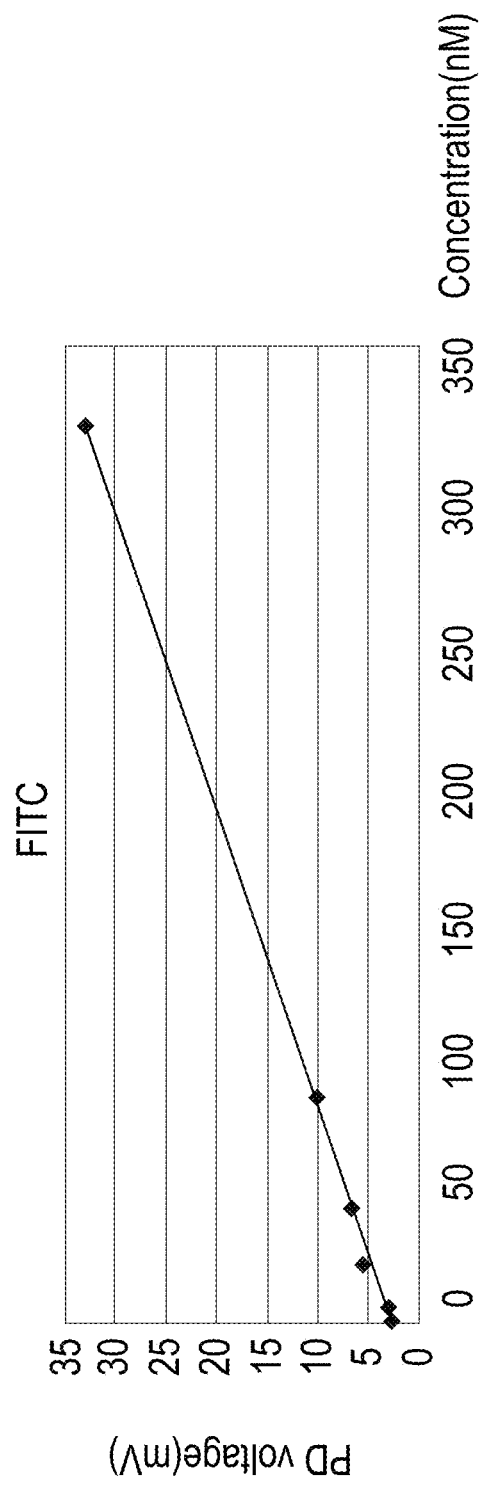
FIG. 8 shows the intensity distribution of fluorescent dyes FITC of different concentrations.
Figure 9:
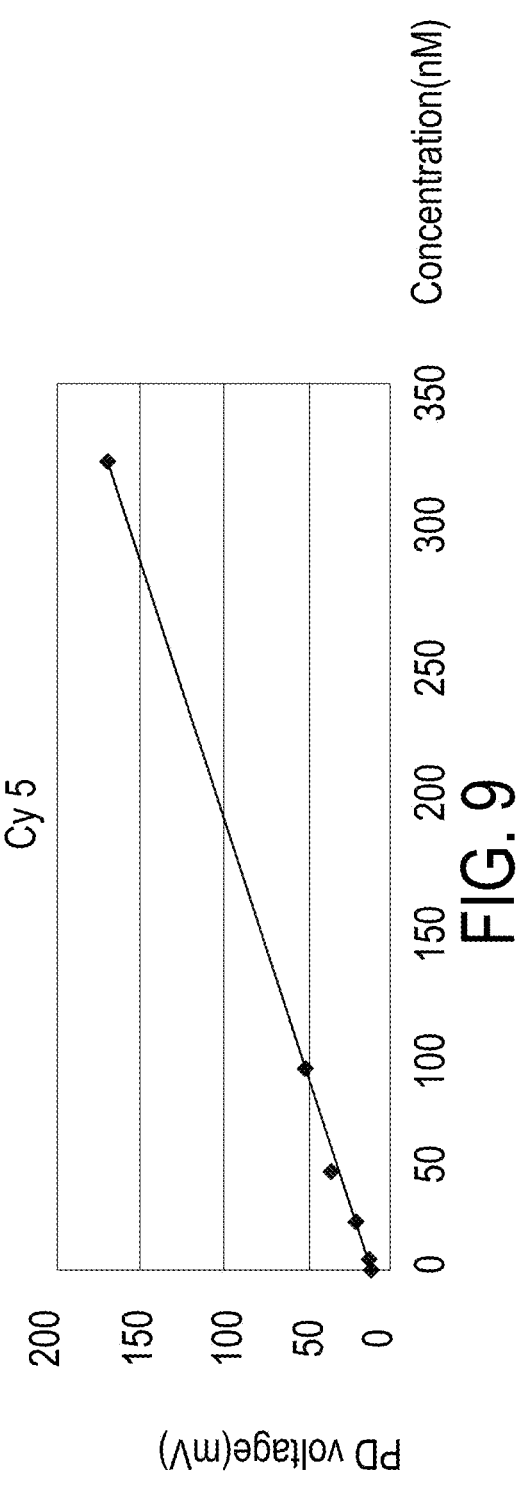
FIG. 9 shows the intensity distribution of fluorescent dyes Cy5 of different concentrations.

Please refer to FIGS. 8 and 9, wherein FIG. 8 shows the intensity distribution of fluorescent dyes FITC of different concentrations, FIG. 9 shows the intensity distribution of fluorescent dyes Cy5 of different concentrations. In the embodiment, the fluorescent dyes, FITC or Cy5 are utilized. The fluorescent dyes are commercially available fluorescent dyes. Although the preferred embodiment of this invention is described with these fluorescent dyes, the system of this invention is not limited to these types of fluorescent dyes. As shown in FIGS. 8 and 9, while the concentration is increased, the intensity of detected signal and SNR are increased.

In conclusion, the present invention provides the portable multi-color fluorescence detection device to analyze simultaneously a plurality of PCR amplifications taking place in real time and to image the fluorescence intensity as a measure for specific target interaction in the plurality of wells. The novel beam shaping module was adopted to increase optical efficiency and uniformity on the plurality of wells. The well-designed optical structure miniaturizes the size and reduces the cost of the illumination module and the detection module, but still provides promising performance whose signal to noise ratio (SNR). The components and structure of the portable multi-color fluorescence detection device contributes the compactness of this optical system.

Moreover, in the previous articles, to realize the multi-site fluorescence detection, a movable mechanics is necessary, such as the movement of light detection module attached a mechanical arm, or the movement of multi-well plate. When multiple fluorescence dyes are presence in the wells, to obtain a better signal noise ratio, a filter wheel, or slides become necessary, thereby the stability and reliability might be affected. While in the scope of this invention, there are no movable parts in the system, and the stability and reliability is enhanced.

In addition, the design and arrangement of the filters as excitation filters, help to achieve the compactness of qPCR system. Besides, the filter sets reduce the interference of noise signal, and allow excitation light beam and emission fluorescent light to be fully utilized, so that the portable multi-color fluorescence detection device is able to provide high signal-to-noise ratio (SNR).

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A portable multi-color fluorescence detection device comprising:
    a plurality of wells configured for accommodating fluorescent mixture;
    an illumination module comprising at least two light sources, a color combination prism and a beam shaping module, wherein the color combination prism is configured for combing different frequency light emitting form the at least two light sources into combination beams, the beam shaping module is located between the color combination prism and the plurality of wells, and is configured for transforming the combination beams into uniform beams to the plane of the plurality of wells, whereby the fluorescent mixture is excited to generate fluorescent light; and
    a detection module comprising a plurality of fiber bundles and an imaging unit, each of the fiber bundles being coupled with the corresponding well;

wherein the fluorescent light is transmitted to the imaging unit through the plurality of fiber bundles and converted into an electrical signal by the imaging unit.

2. The portable multi-color fluorescence detection device according to claim 1, wherein the illumination module further comprises at least two filters, and each filter is arranged in front of each light source.

3. The portable multi-color fluorescence detection device according to claim 2, wherein each of the filters is an excitation filter.

4. The portable multi-color fluorescence detection device according to claim 2, wherein each of the filters is a stationary band pass filter.

5. The portable multi-color fluorescence detection device according to claim 1, the color combination prism is an X-Cube.

6. The portable multi-color fluorescence detection device according to claim 1, the color combination prism is a Philips prism having a plurality of prism segments.

7. The portable multi-color fluorescence detection device according to claim 1, wherein the beam shaping module comprises a beam shaping component and a cylinder lens, and the beam shaping component consists of two fly eye lenslet arrays.

8. The portable multi-color fluorescence detection device according to claim 1, wherein the beam shaping module comprises an aspherical shaping lens, and a cylinder Fresnel lens.

9. The portable multi-color fluorescence detection device according to claim 1, further comprising a support for supporting the plurality of wells.

10. The portable multi-color fluorescence detection device according to claim 9, wherein the support further comprises a heating chamber for accommodating the plurality of wells.

11. The portable multi-color fluorescence detection device according to claim 10, wherein the plurality of wells is heated or cooled by the thermal contact with the heating chamber.

12. The portable multi-color fluorescence detection device according to claim 10, wherein the support comprises a plurality of optical apertures, the optical apertures are located at the front and the rear of the heating chamber.

13. The portable multi-color fluorescence detection device according to claim 1, the plurality of wells are applied in a close-loop fluidics system.

14. The portable multi-color fluorescence detection device according to claim 1, wherein the imaging unit comprises of imaging lens, filters and transducers, each imaging lens is arranged to transfer the fluorescence light from each fiber bundle to the corresponding transducer, and the filter is sandwiched between the imaging lens and transducer.

* * * * *